(12) United States Patent
Jones et al.

(10) Patent No.: US 7,147,209 B2
(45) Date of Patent: Dec. 12, 2006

(54) WINDOW BELT MOLDING REMOVAL TOOL

(75) Inventors: Kenneth V. Jones, Chinook, MT (US); Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 98 days.

(21) Appl. No.: 11/023,662

(22) Filed: Dec. 28, 2004

(65) Prior Publication Data

US 2006/0137159 A1    Jun. 29, 2006

(51) Int. Cl.
    *B66F 15/00*    (2006.01)

(52) U.S. Cl. .......................... 254/25; 29/278

(58) Field of Classification Search .......... 254/25, 254/131, 28; 269/3, 6; 29/278
    See application file for complete search history.

(56) References Cited

U.S. PATENT DOCUMENTS

| 149,313 | A | * | 4/1874 | Kurau | 254/25 |
| D314,321 | S | * | 2/1991 | Johnston | D8/89 |
| 6,893,004 | B1 | * | 5/2005 | Ploeger | 254/25 |
| 6,994,322 | B1 | * | 2/2006 | Wittman | 254/131 |

OTHER PUBLICATIONS

Invention Disclosure Agreement dated Feb. 8, 1999, Kenneth V. Jones, "Belt Moulding Saver."
Invention Disclosure Agreement dated Jun. 19, 2001, Leroy Pfingston, "Belt Mold Removal Tool".
Invention Disclosure Agreement dated Feb. 15, 2004, Randy Worthington, "Belt Moulding Removal Tool".

* cited by examiner

*Primary Examiner*—Lee D. Wilson
(74) *Attorney, Agent, or Firm*—Banner Witcoff, Ltd.

(57) ABSTRACT

A tool for removal of an automotive window belt molding from a body member includes a formed hook on the end of a generally flat, rigid, elastically deformable planar sheet.

3 Claims, 3 Drawing Sheets

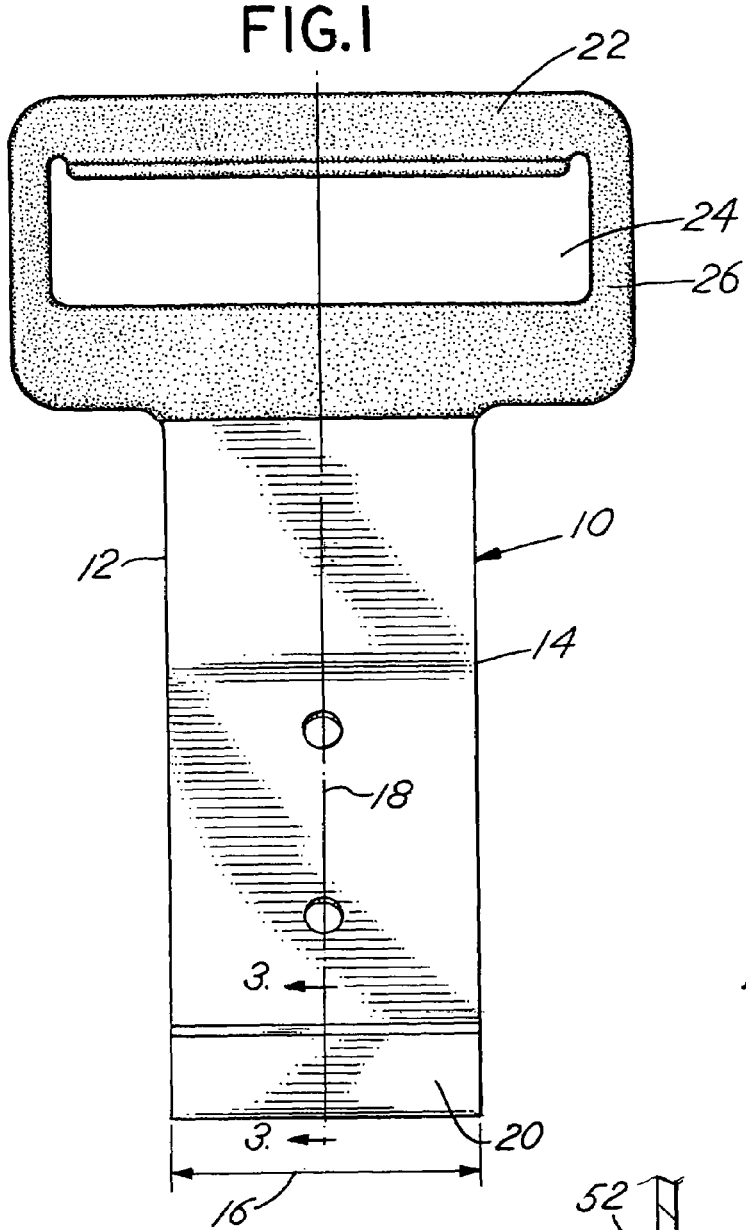
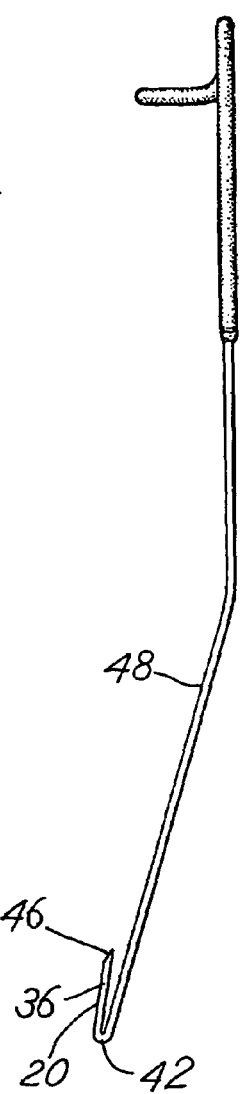
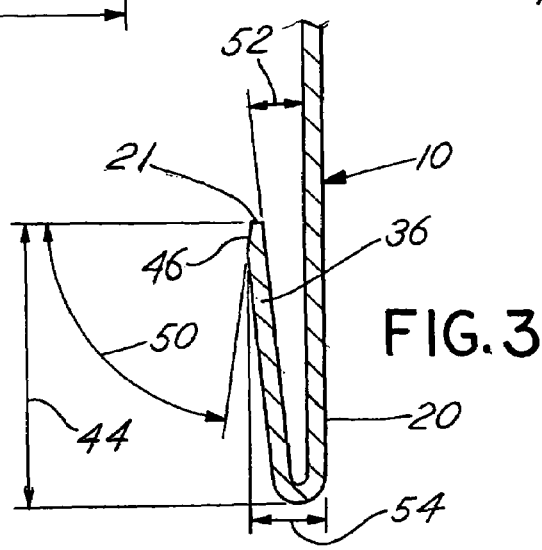

WINDOW BELT MOLDING REMOVAL TOOL

BACKGROUND OF THE INVENTION

In a principal aspect the present invention relates to a tool which may be utilized to effect the removal of window belt molding from the window opening or frame in the body of a motor vehicle.

Motor vehicles typically include a window frame which defines the area in which a glass window is positioned. Typically, the vehicle window is associated with a mechanism for lowering the window to permit access to the interior of the vehicle. Also, typically the window frame of the motor vehicle includes a peripheral or partially peripheral belt molding fitted around the window frame and attached to the vehicle body. The belt molding is generally a molded plastic member with an attached rubber lip that is designed to fit or rest against the outside of the car window. Clips are used to attach the molding to the outer door skin of the motor vehicle. That is, the outer door skin typically includes a downwardly projecting interior flange. The belt molding is affixed to that flange by means of one or more metal clips.

In the event an automobile vehicle is damaged, insurance adjusters often require the body shop repairing the vehicle to remove the belt molding or window molding before repainting the repaired vehicle body. This requirement is made so that the body will be fully painted under the moldings. As a consequence, it is generally necessary to remove the window or belt molding from the vehicle body. However, removal is often rendered difficult and if the molding is damaged, or if the clips don't properly hold the molding, then the molding may need to be replaced.

Thus, there has developed a need for a tool which will easily effect removal of a window or belt molding without damage to the molding and in a manner which will interact with clips associated with retention of the belt molding in an effective, non-destructive manner.

SUMMARY OF THE INVENTION

Briefly, the present invention comprises a tool for removal of an automotive vehicle window belt molding from a vehicle body member wherein the molding is typically retained on the body by one or more clips that attach the molding to a flange associated with the body panel. The invention is useful with body panels made from materials other than metal such as molded plastic or fiber glass. In any event, the tool comprises a generally flat, rigid, but elastically deformable planar sheet of material, typically a sheet of metal. The sheet of metal has generally parallel, spaced lateral sides with a longitudinal dimension, a lateral or side to side dimension extending between the lateral sides and a bottom hook end. A handle is incorporated in the top handle end of the tool. The hook has a unique and special construction. Thus the lateral or side to side dimension of the hook is substantially equal to the lateral dimension of the sheet. The hook further employs a uniform cross-section configuration between the lateral sides of the sheet. The hook is formed as a folded over extension at the bottom edge of the sheet. The sheet has a thickness in the range of 0.0375 to 0.045 inches. The plane of the sheet forms an angle with the plane of the hook element in the range of about 4.5 to 6.75 degrees. Importantly, the hook includes a wedge shape leading edge with an outwardly disposed face defining or having a flat planar extension toward the plane of the sheet in the range of 6 to 10 degrees to thereby provide a leading edge or a means for engaging with a clip member to remove the clip from the body flange.

Thus, it is an object of the invention to provide an improved tool for removal of an automotive window belt molding from a vehicle body member.

It is a further object of the invention to provide a tool for removal of an automotive window belt molding which is rugged, easy to utilize in combination with multiple types and sizes of window belt molding materials and which is inexpensive.

These and other objects, advantages and features of the invention will be set forth in the detailed description which follows.

BRIEF DESCRIPTION OF THE DRAWING

In the detailed description as follows reference will be made to the drawing comprised of the following figures:

FIG. 1 is a plan view of the tool of the invention;

FIG. 2 is a side view of the tool of FIG. 1;

FIG. 3 is a cross-sectional view taken along the line 3—3 in FIG. 1;

DESCRIPTION OF THE PREFERRED EMBODIMENT

Figure 4:
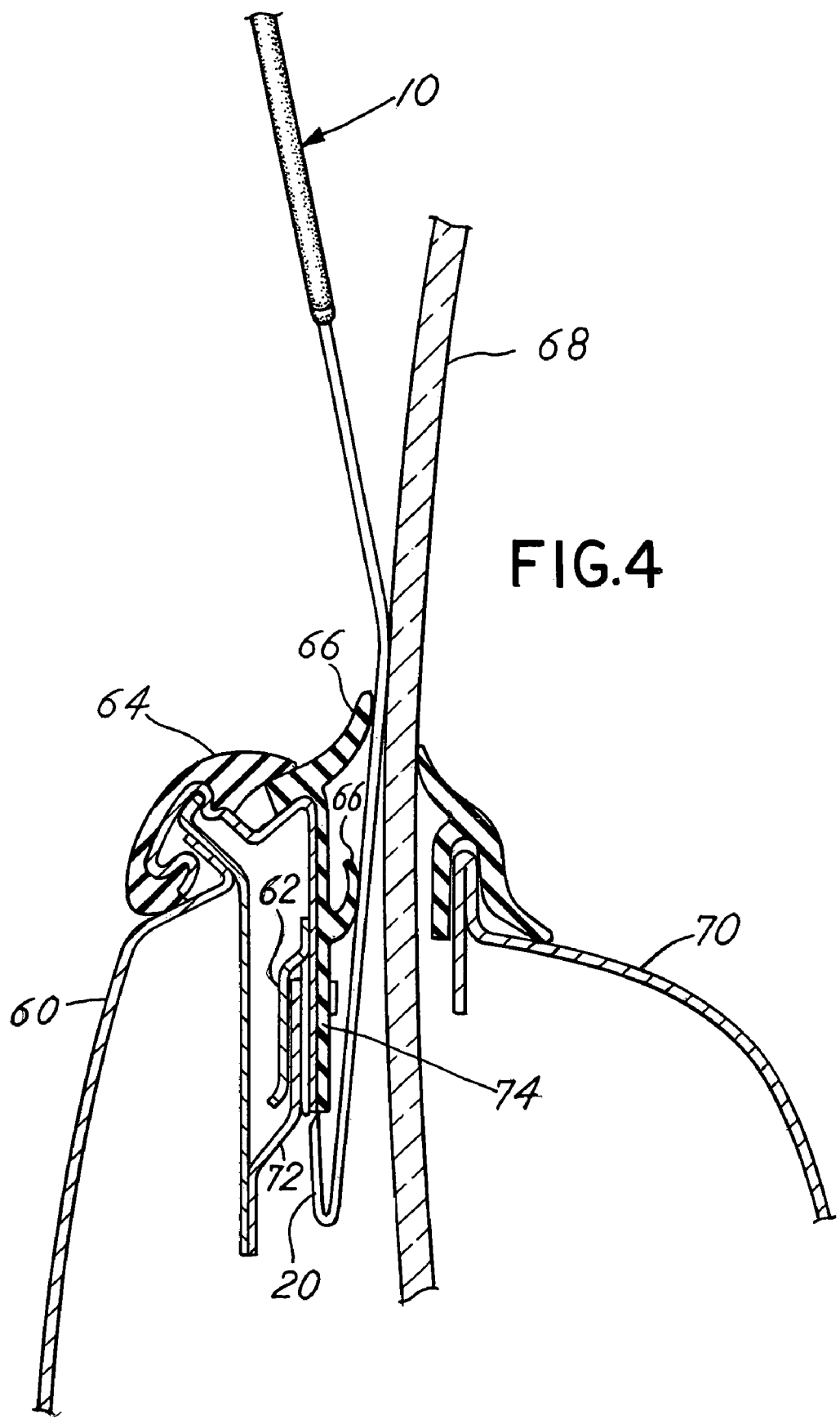
FIG. 4 is a cross-sectional view depicting the manner of use of the tool of FIGS. 1–3.

Referring to the figures, and in particular FIGS. 1–3, the tool of the invention is comprised of a generally flat, rigid, elastically deformable planar sheet 10. The flat planar sheet typically comprises a sheet metal material. The sheet metal may be in the range of thickness of about 0.0375 to 0.045 inches. Stock sheet metal may be utilized in the practice of the invention. It is also contemplated that certain plastic materials may be utilized.

The flat planar sheet 10 includes a first lateral side 12 and a generally parallel, second lateral side 14. The lateral sides 12, 14 are spaced a uniform distance or dimension 16. A longitudinal axis 18 bisects the lateral sides 12 and 14. The sheet 10 further includes a lower edge or hook end 20 at the distal end of a lower section 11. A handle end 22 is provided opposite the hook end 20 and includes an elongate hand passage or opening 24 defining a hand hold to enable a mechanic or worker to place their fingers therethrough. The upper or handle end 22 typically includes a protective vinyl coating 26 to protect the fingers of an individual using the tool.

The sheet 10 includes a lower section 11 and an upper or handle end section 13. Each of these sections 11, 13 are generally flat planar sections. They intersect at an obtuse angle of about 160°±20° and preferably 160°±2° to facilitate the function of ease of insertion as described below. The axial extent of the lower section is preferably greater than 3.0 inches.

The lower or hook end 20 has a generally uniform cross-section between the lateral sides 12 and 14. This uniform cross-section is depicted in FIG. 3, for example. Thus, the main sheet or body sheet 10, includes a folded-over end 36 which defines the hook end 20. The depicted configuration shape and arrangement of the hook end 20 is an important part of the invention inasmuch as it enables utilization of the tool efficiently and effectively for its intended purpose. Thus, referring to the figures, the lateral dimension in the preferred embodiment; namely, the dimension 16, is in the range of 2.250 plus or minus 0.25 inches. The folded-over hook end 20 has a dimension 44 from a lower edge 42 in the range of 0.68 to 0.70 inches. The hook end 20 further includes an outwardly disposed face 46 which defines a plane 46 which is inclined toward the plane 48 of the sheet 10 as depicted in FIG. 3. Various angular relationships are important to the invention. The angle 50 which the flat plane 46 forms with a plane that is parallel to the plane of the lower end of the sheet 10 is in the range of about 82±4.0 degrees, preferably plus or minus 1 to 2 degrees. The upwardly turned hook section 36 as depicted in FIG. 3 forms an angle 52 with the plane of the sheet 10 in the range of about 4.5 to 6.75 degrees, preferably 5.7±1.0 degrees. The linear distance 54 between the outside face of the sheet 10 and the maximum extension of the hook 20 is the range of 0.160 to 0.185 inches, preferably about 0.179 inches.

Figure 5:
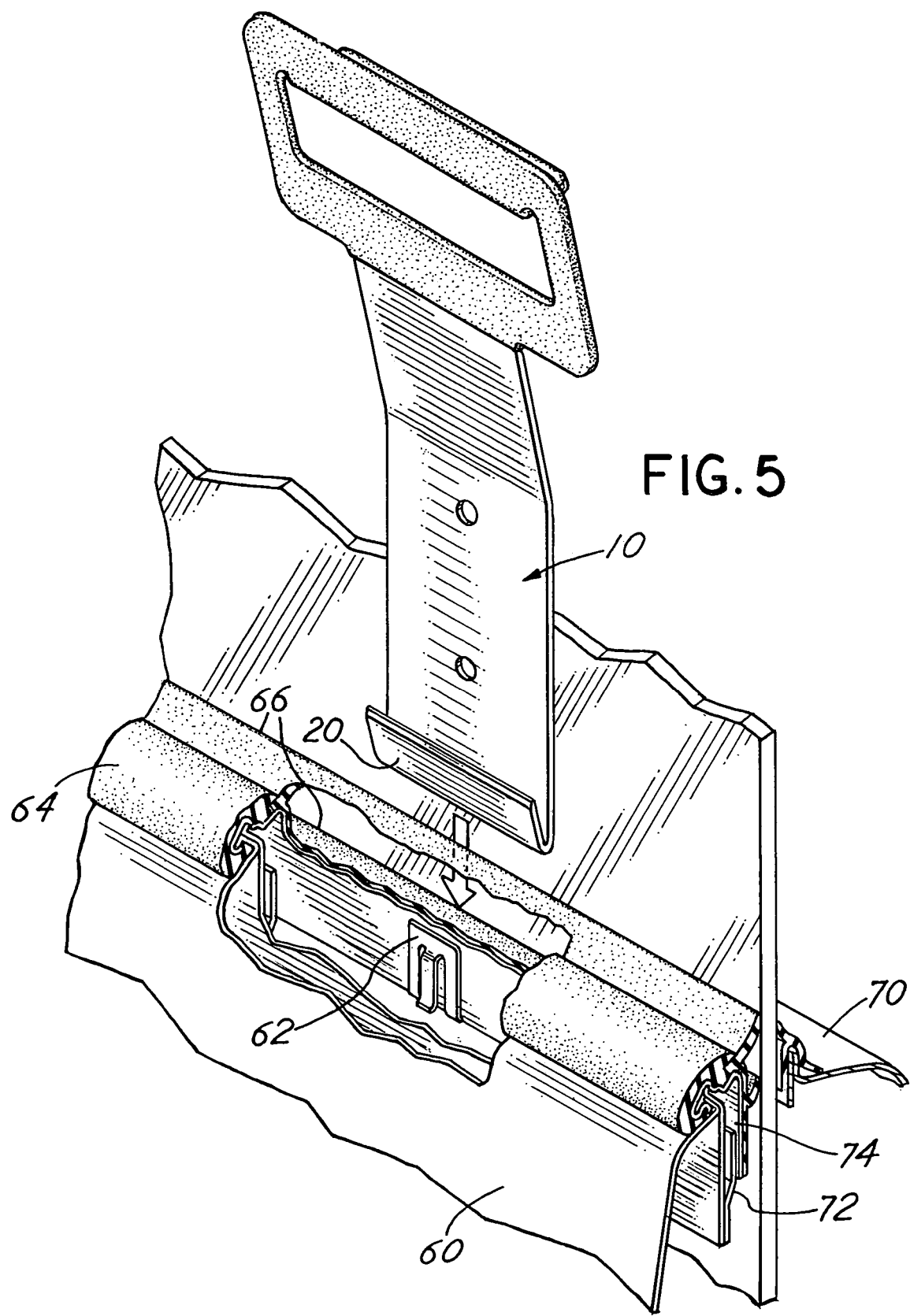
FIG. 5 is an exploded isometric view depicting the method of utilization of the tool of FIGS. 1–3.

FIGS. 4 and 5 illustrate the manner of usage of the tool. As depicted in those figures an automotive vehicle typically will include an outer body skin such as an outer door skin 60. A metal clip 62 will typically hold a window molding 64 in position on a depending interior flange 72. The window molding 64 typically includes 1 or 2 rubber wipes 66 which fit against a pane of glass 68 which may be raised and lowered in the window frame of the motor vehicle. The glass 68 is positioned between an inner door construction 70 and the skin 60.

The tool of the invention and more particularly the hook 20 may be slid or inserted against the rubber wipes and directed downwardly in the space between the glass 68 and the window molding 74. The hook 20 may then engage against the clip 62 causing the clip 62 to be pulled upwardly to effect removal of the clip 62 from attachment thereof to flange 72 associated with the outer door skin 60. Of course, various motor vehicles include various shapes of the outer door skin and associated component parts such as flanges, window moldings and clips. The tool of the invention, however, is constructed in a manner which enables utilization thereof for a wide range of such constructions.

It is to be noted further that the hook end or hook 20 hooks under the window molding flange 74 as well as clip 62. Importantly, as discussed previously the configuration of the hook 20 is an important feature inasmuch as the leading edge 21 thereof is designed to fit under the flange 72 to effect removal of clip 62 and the window molding 64.

While there has been set forth the preferred embodiment of the invention, it is to be understood that the invention is limited only by the following claims and equivalents thereof.

What is claimed is:

1. A tool for removal of an automotive window belt molding from a body member wherein the molding is retained by one or more clips, said tool comprising, in combination:

a generally flat, rigid, elastically deformable planar sheet having opposite lateral sides;

a longitudinal dimension, a sheet lateral dimension between the lateral sides;

a bottom hook end, a top handle end, a handle at the top handle end, and a hook having a hook lateral dimension substantially equal to the sheet lateral dimension, said hook having a generally uniform cross-sectional configuration between the lateral sides of the sheet, said hook formed as a folded over extension of the sheet, said sheet having a thickness in the range of about 0.0375 to 0.045 inches, and the plane of the sheet forming an angle with the plane of the hook in the range of about 4.5° to 6.75°, said hook having a wedge shaped leading edge with an outwardly disposed face defining a flat planar extension toward the sheet in the range of 6° to 10°, to thereby provide a means for engaging and displacing a clip.

2. The tool of claim 1 formed from a flat planar metal sheet.

3. The tool of claim 1 wherein the plane of the hook extension forms an angle of about 5.7°±1.0°.

* * * * *